United States Patent [19]

Bolgiano

[11] 4,446,339

[45] May 1, 1984

[54] ROTARY DIAL DECODER

[75] Inventor: Duane R. Bolgiano, Bala Cynwyd, Pa.

[73] Assignee: International Mobile Machines Corporation, Bala Cynwyd, Pa.

[21] Appl. No.: 371,808

[22] Filed: Apr. 26, 1982

[51] Int. Cl.³ .............................................. H04M 3/38
[52] U.S. Cl. .................................. 179/84 R; 179/2 A
[58] Field of Search ............ 179/84 R, 84 SS, 16 EA, 179/2 A, 2 AM

[56] References Cited

U.S. PATENT DOCUMENTS 4,006,316 2/1977 Bolgiono ........................... 179/84 R Primary Examiner—A. D. Pellinen
Assistant Examiner—James L. Dwyer
Attorney, Agent, or Firm—Arthur A. Jacobs

[57] ABSTRACT

A telephone system for actuating a function-generating device such as ringing a telephone bell, lighting a lamp, reading a meter, and the like, the system being adapted to be directly operated by a pulse-generating means such as a rotary telephone dial.

6 Claims, 3 Drawing Figures

ROTARY DIAL DECODER

This invention relates to a telephone-operated system for generating a function, such as ringing a telephone bell at a particular telephone receiver, or lighting a lamp, or reading a meter, or activating a recorder, or generating any other function which may be electrically actuated; and it particularly relates to a system of this type which is operated by a pulse-generating means such as a rotary telephone dial.

Telephone networks may be AC coupled as in the case of tone systems operated by push bottons, or DC coupled as in the case where pulses are produced, as, for example, when rotary dials are used; however, even in the latter instance, the DC coupling generally exists only between the subscriber telephone instrument and the local central office. The remaining parts of the network, as, for example, the connections between central office to central office, are generally AC coupled. Since it is necessary to use a relay or its equivalent to actuate a function, and since such relay depends on DC coupling, a dial system would not, heretofore, have been capable of operating the function generating means. Even if a rectifier were used to convert the AC current to DC there would be no continuing current and, therefore, no responsive actuation of the relay switches.

In addition to the above, a rotary dial system normally operates in the sub-audible 8 to 11 Hz range whereas the telephone system, as a whole, is designed to normally operate in the audible 300 to 3000 Hz range, which is the range of the AC system. However, the rotary dial, which produces what is, in effect, a square or rectangular wave, does have some higher frequency components which are in the audible 300 to 3000 Hz range. These higher frequency components pass through the network and are observable at the other end, but generally modulated at an 8 to 11 (nominally 10) Hz rate.

In accordance with the present invention, the audible higher frequency components of the rotary dial are detected, and it is then ascertained whether these components are modulated at a particular rate, such as within the 8 to 11 Hz (nominally 10 Hz) range, this system being such that it accommodates itself to count on the basis of that variable rate. The system then determines the quantity of these audible higher frequency components (the number that was dialed) and, in a preferable form of the invention, stores this information in a memory from which it is passed to the function generating means. Although, as stated above, the memory is preferable, it is not essential to the operation of the system.

It is, therefore, an object of the present invention to provide a telephone network operated by a dial system wherein the dialed signals are capable of actuating a function-generating device.

Another object of the present invention is to provide a network of the aforesaid type which utilizes those portions of the dialed signals that are in the audible range.

Another object of the present invention is to provide a network of the aforesaid type which is relatively simple in construction and relatively inexpensive to produce.

Other objects and many of the attendant advantages of the present invention will be readily appreciated as the same become better understood by reference to the following description when read in conjunction with the accompanying drawings wherein.

Figure 1:
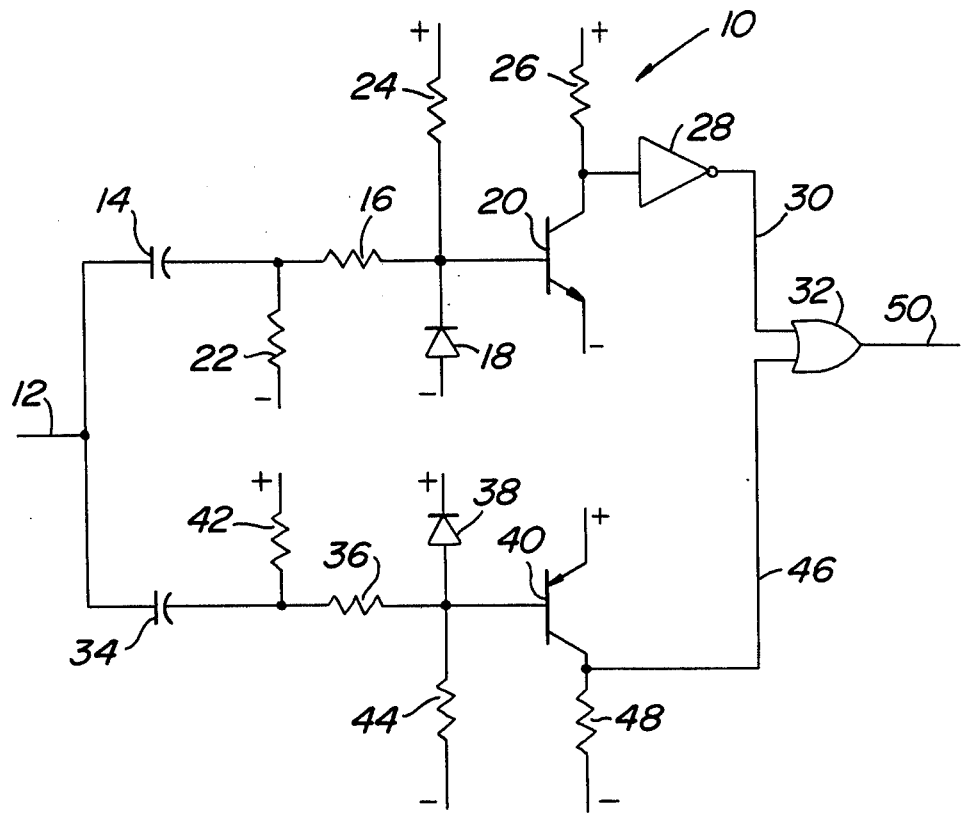
FIG. 1 is a schematic view of the dial detection network.

Referring to the drawings, wherein similar reference characters refer to similar parts, there is shown in FIG. 1 a network, generally designated 10, that comprises a telephone line input 12 through which clicks, transients or any other signals generated by a rotary dial may pass.

The input 12 is connected to a capacitor 14 that is coupled to a resistor 16 which is connected to a rectifier 18. The rectifier 18 is connected to a transistor 20 that is biased negatively by a resistor 22 and positively by a resistor 24. A resistor 26 positively biases the collector of transistor 20. The collector of transistor 20 is coupled to an inverter 28, whereby positive input pulses pass through line 30 to an OR gate 32.

The input 12 is also coupled to a capacitor 34 that is connected to a resistor 36 that is, in turn, connected to a rectifier 38. The rectifier 38 is connected to a transistor 40 which is positively biased by resistor 42 and negatively biased by a resistor 44. The collector of the transistor 40 is coupled via line 46 to the OR gate 32, whereby negative input pulses are passed to that OR gate, the collector of transistor 40 being negatively biased by a resistor 48.

The output from OR gate 32, which is connected in the above manner to transistors 20 and 40, is indicated at 50.

Figure 2:
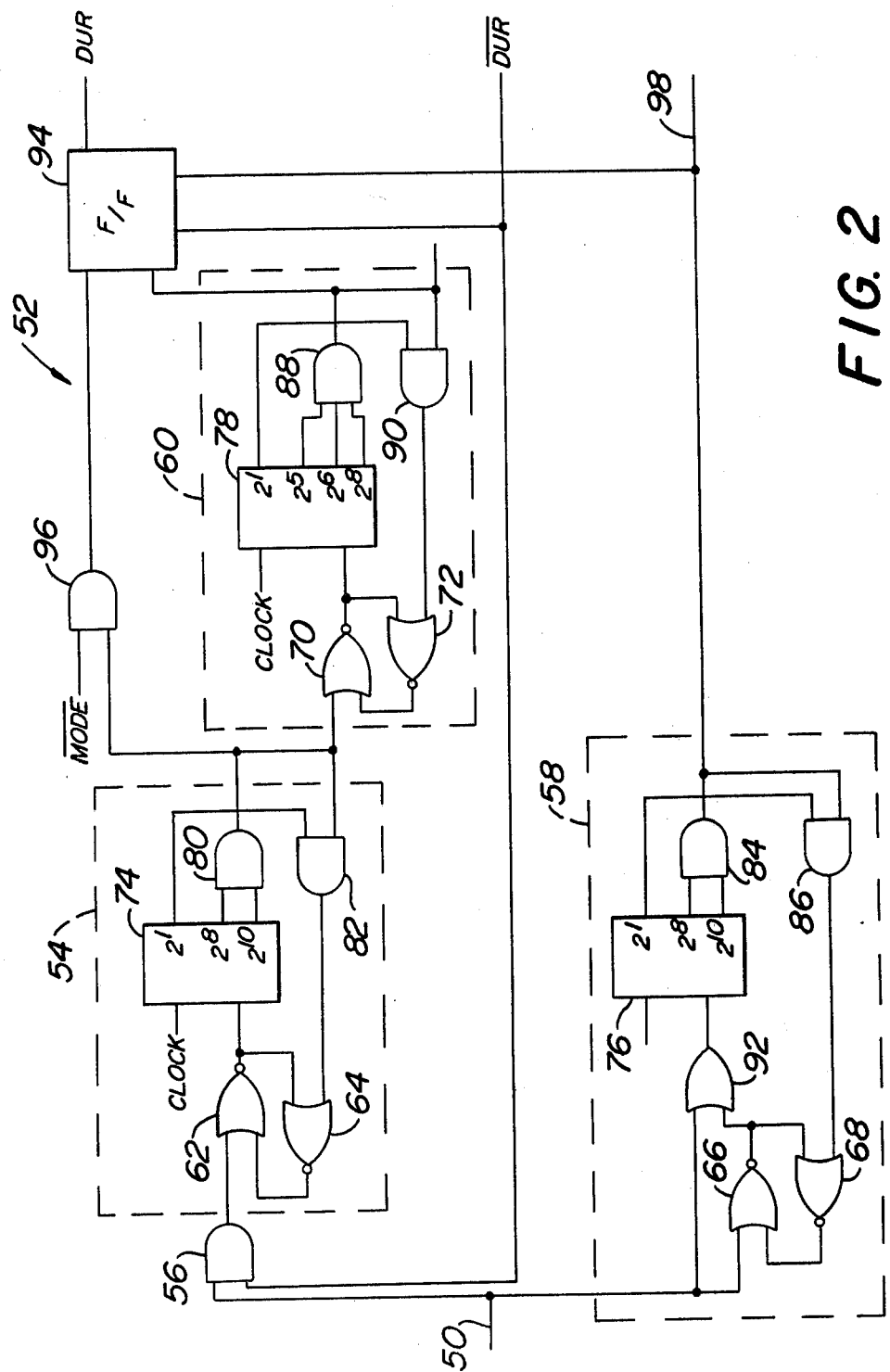
FIG. 2 is a schematic view of the filter network.

As shown in FIG. 2, the filter network, generally designated 52, receives the output 50 (the input in this figure) from the OR gate 32 and passes it both to a monostable (shown in dotted outline), generally designated 54, through an AND gate 56, and to a monostable, (shown in dotted outline), generally designated 58. A third monostable, (shown in dotted line), generally designated 60, is operated by monostable 54. These monostables are of the general type disclosed in U.S. Pat. No. 4,263,556, dated Apr. 21, 1981, and comprise a flip flop, constituted by cross-coupled gates 62 and 64 in monostable 54, by cross-coupled gates 66 and 68 in monostable 58 and by cross-coupled gates 70 and 72 in monostable 60. The flip flop in each monostable has an output connected to a counter, as indicated by counter 74 in monostable 54, by counter 76 in monostable 58 and by counter 78 in monostable 60.

The counter in each monostable receives pulses from a clock system and each has an output conditioned by AND gates such as gates 80 and 82 in monostable 54, gates 84 and 86 in monostable 58 and gates 88 and 90 in monostable 60. An OR gate 92 is additionally provided between the flip flop and the counter in monostable 58.

Monostable 54 has a duration of 125 milliseconds and is non-resettable, whereas monostable 58, which also has a duration of 125 milliseconds, is resettable because of the insertion of the OR gate 92 between the flip flop and the counter.

A flip flop 94 is connected to receive the outputs from the monostables, the output from monostable 54 being passed into an AND gate 96 which also receives the $\overline{MODE}$ signal (hereinafter disclosed).

Assuming that the system is at rest and the flip flop 94 is in a reset condition, any pulses at input 50 will activate both monostable 58 and monostable 54 via gate 56. The nominal dial speed is 10 pps (pulses per second) and normally varies from 8 to 11 pps. At the lower speed (8 pps) the longest time between two originating pulses would be 125 milliseconds since this is the duration at the monostable. Therefore, the output of monostable 54 is a short pulse (e.g. 200 microseconds) occuring 125 milliseconds after the start of the first pulse detected at 50, while a similar short pulse 98 is produced by monostable 58 at an interval of 125 milliseconds after the end of the previous pulse. Consequently, the time between the pulse produced by monostable 54 and that produced by monostable 58 is the time between the beginning and end of the pulses appearing at the input 50. If the MODE at gate 96 is positive, then the outputs of the two monostables 54 and 58 operate the flip flop 94 to produce a single pulse DUR having a duration corresponding to the period of time between the beginning and end of the pulses at the input 50.

Monostable 60 has a duration of about 60 milliseconds and is non-resettable. It is actuated by a pulse from monostable 54. The output of monostable 60 is adapted to set the flip flop 94, whereby if MODE is negative then DUR from the flip flop 94 has a duration of 60 milliseconds less than the time interval between the beginning and ending of the pulses at the input 50. DUR, from flip flop 94, is the inverse of DUR as produced by that flip flop.

The pulses at 50 consist of two parts, one of which will produce an undesirable time bias if not deleted. Monostable 60, which constitutes a subtraction circuit, eliminates this undesirable part.

Figure 3:
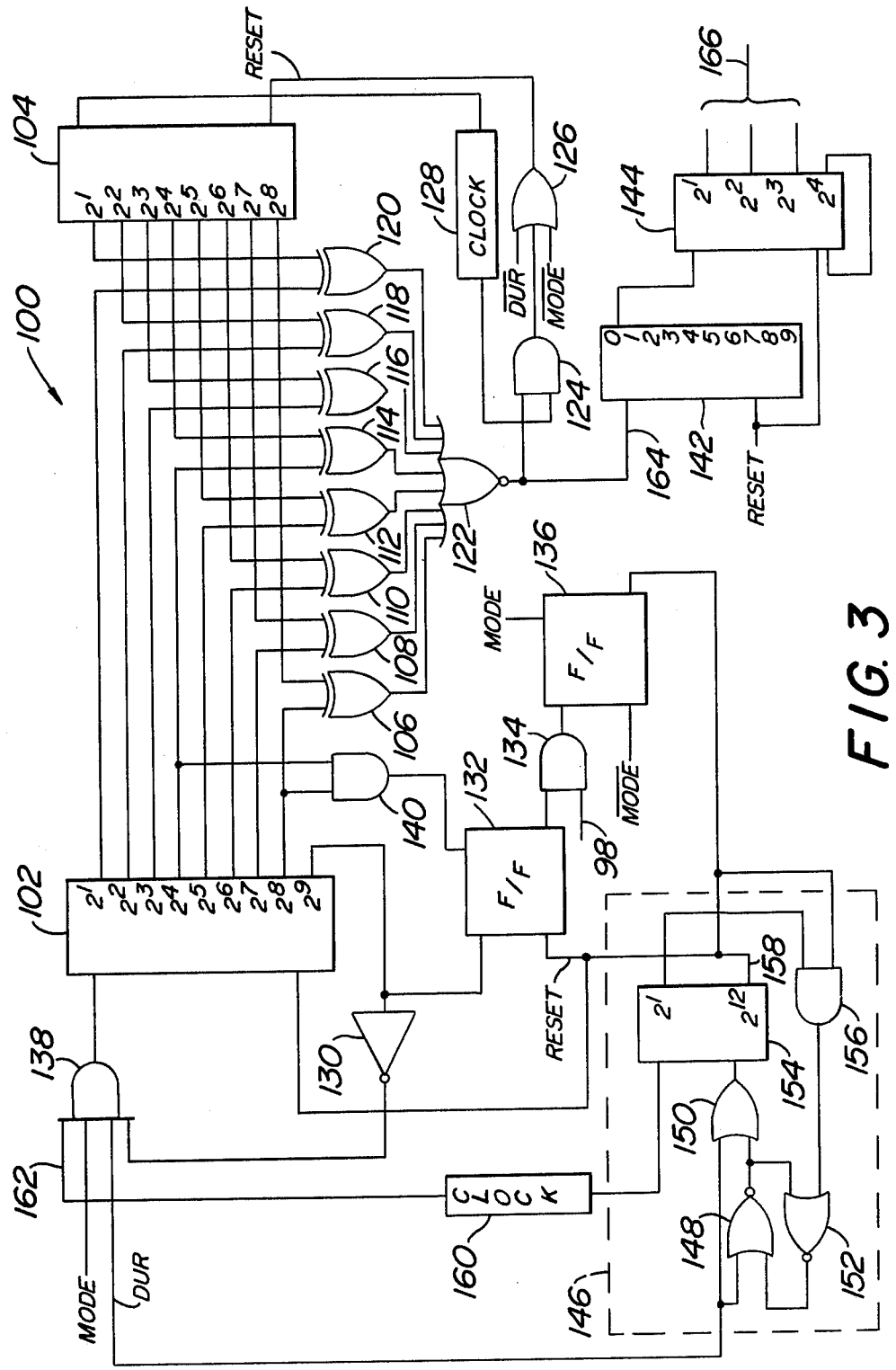
FIG. 3 is a schematic view of the comparator, memory and control network.

The network, generally designated 100, shown in FIG. 3, comprises five different circuits, namely (a) a memory circuit including a counter 102, (b) a divide by 0.6 circuit including a counter 104, exclusive OR gates 106, 108, 110, 112, 114, 116, 118 and 120, an inclusive NOR gate 122, an AND gate 124, an OR gate 126 and a clock 128, (c) a mode control circuit including an inverter 130, a flip flop 132, an AND gate 134, a flip flop 136 and AND gates 138 and 140, (d) a counter circuit including counters 142 and 144, and (3) a time out monostable, generally designated 146. The monostable 146 is of the same type as the monostables shown in FIG. 2 and includes gates 148, 150 and 152, counter 154 and gate 156.

The counter 102, comprising a memory circuit, remembers the rate of speed of the dial, this rate being stored therein.

When the digit "zero" is dialed ("zero" representing 10 pulses), the speed of the dial is stored in counter 102. Then the subsequent digits are counted by counter 104 and compared by the gates 106 to 122. MODE is a control which indicates whether the digit dialed is "zero" or any subsequent digit.

This system is operated by asking the caller to (a) wait the duration of monostable 146 (e.g. about 6.4 seconds), (b) dial "zero" and (c) dial each successive digit within the duration of monostable 146.

By waiting the duration of monostable 146, a pulse is produced by that monostable at 158 which resets flip flops 132 and 136 and counters 102 and 104. In this respect, monostable 146 resets the system if any pulses appearing at the input are not between 8-11 Hz.

A clock 160, at 160 Hz, is connected to counter 102, and the clock 128, previously indicated to be part of the divide by 0.6 circuit, is connected to counter 104. The clock 128 is 98 times as fast as the clock 160.

The table which follows illustrates the relationship between the number dialed and the originating and subsequent pulses in the system, the duration being represented in milliseconds:

TABLE

| Number Dialed | A Nominal Duration of Orig. Pulses (About 10 pps.) | B Dur. of Orig. Pulses (About 11 pps.) | C Dur. Of Orig. Pulses (About 8 pps.) | D A less 60 ms. | E B less 60 ms. | F C less 60 ms. |
| --- | --- | --- | --- | --- | --- | --- |
| 1 | 100 | 91 | 125 | 40 | 31 | 65 |
| 2 | 200 | 182 | 250 | 140 | 122 | 190 |
| 3 | 300 | 273 | 375 | 240 | 213 | 315 |
| 4 | 400 | 364 | 500 | 340 | 304 | 440 |
| 5 | 500 | 455 | 525 | 440 | 395 | 565 |
| 6 | 600 | 545 | 750 | 540 | 485 | 690 |
| 7 | 700 | 636 | 875 | 640 | 576 | 815 |
| 8 | 800 | 727 | 1,000 | 740 | 667 | 940 |
| 9 | 900 | 818 | 1,125 | 840 | 758 | 1,065 |
| 0 | 1,000 | 909 | 1,250 | 940 | 849 | 1,190 |

When the pulses are originated, only the transients (higher frequency components) are received. The first transient occurs about 60 milliseconds after the beginning of the first pulse so that while the originating pulses may have durations such as shown in the columns A, B and C of the Table, the received pulses (e.g. DUR) are approximately represented by the figures in columns D, E and F. In other words, each of the subsequent pulses has a total duration represented by the duration of "zero" divided by 9.6 times the digit number. Therefore, when "zero" is dialed, DUR, if received correctly, will last between about 849 and 1,190 milliseconds.

DUR permits the output of the clock 160, which equals 160 Hz, to be applied at 162 to the counter 102, via gate 138. If the output of the counter 102 exceeds 850 milliseconds, the flip flop 132 is set. Furthermore, when the pulses end, the monostable 58 (FIG. 2) produces a pulse at 98 which is applied to AND gate 134 to set flip flop 136. If DUR exceeds 1,600 milliseconds, the flip-flop 132 is reset so that flip flop 136 is not set. This permits the circuit to operate with dials as slow as 6 pps.

In the above manner, if "zero" is dialed and detected, the flip flop 136 is set, which makes MODE negative and MODE positive, whereby counter 102 stores the speed of the dial and produces a binary representation of that speed which is applied to the exclusive OR gates 106–120. The next digit then permits the counter 104 to operate for the duration of DUR.

Since the counter 104 is operated by the clock 128 at a speed that is 96 times the speed of the clock 160 which drives the counter 102, the outputs of the two counters are compared by gates 106–120 and by gate 122 to produce pulses at the output of gate 122 which represent the time stored in counter 102 divided by the number "96". This output is applied at 164 to counter 142 which then multiplies by 10.

The pulses from counter 142 are counted by counter 144 so that the output from counter 144 gives a representation of the subsequent digits dialed. This output, indicated at 166, activates the device or system which generates the particular function desired.

Different codes may be used to activate different functions so that the function to be activated depends on the input at 12 in FIG. 1.

The invention claimed is:

1. In a rotary dial actuated telephone system, means for detecting frequency transients produced by the rotation of a telephone dial, means for determining a fixed time period for passage of said transients from the dial to a telephone receiver network, means for counting the quantity of said transients passing to said receiver network within said fixed time period, means for translating the quantity of transients passed to said receiver network within said time period into an actuating signal, and generating means to utilize said actuating signal to generate a desired function.

2. The system of claim 1 wherein said system includes a pair of counters, one of said counters being adapted to count and store an initial quantity of transients generated by an initial full rotation of the dial, said quantity of transients representing the speed of the dial and comprising said fixed time period, and the other of said counters being adapted to count and store subsequent quantities of transients generated by subsequent rotations of the dial during said fixed time period.

3. The system of claim 2 wherein said one of said counters is operated by a first clock at a first speed and said other of said counters is operated by a second clock at a second speed, and means to compare the output of said counters and to produce pulses based on the speed of the first clock divided by the speed of said second clock, said pulses comprising said actuating signal.

4. The system of claim 1 wherein said transients are in the audible frequency range.

5. The system of claim 1 wherein means are provided for modulating said transients at a predetermined rate.

6. The system of claim 1 wherein there is provided a memory means for storing the quantity of transients prior to passage thereof to said generating means.

* * * * *